United States Patent [19]
Bernheim et al.

[11] 3,725,502
[45] Apr. 3, 1973

[54] WATER-SOLUBLE OR INHERENTLY WATER-DISPERSIBLE CONDENSATION PRODUCTS

[75] Inventors: Willy Bernheim, Diedorf bei Augsburg; Hans Deiner, Neusass bei Augsburg, both of Germany

[73] Assignee: Chemische Fabrik Pfersee GmbH, Augsburg, Germany

[22] Filed: July 13, 1970

[21] Appl. No.: 54,590

[30] Foreign Application Priority Data

July 19, 1969 Germany....................P 19 36 886.6

[52] U.S. Cl. .......260/830 TW, 260/2 N, 260/47 EN, 260/77.5 C, 260/78.4 EP
[51] Int. Cl. ..............................................C08g 30/14
[58] Field of Search..260/2 EP, 2 CN, 47 EP, 47 CN, 260/29.2 EP, 78.4 EP, 830 TW, 77.5 C

[56] References Cited

UNITED STATES PATENTS

| | | | |
|---|---|---|---|
| 3,335,105 | 8/1967 | Burnthall et al.........................260/47 |
| 3,456,035 | 7/1969 | Enders et al..............................260/2 |
| 2,723,241 | 11/1955 | De Groote et al......................260/47 |

*Primary Examiner*—William H. Short
*Assistant Examiner*—T. Pertilla
*Attorney*—Krafft & Wells

[57] ABSTRACT

Water-soluble or inherently water-dispersible condensation products which cross link with heating are prepared by reacting with heating, and preferably in the presence of water-miscible solvents having boiling points above approximately 50°;

a. about 1 mole of urea, guanidine, derivatives of guanidine or the products of the decomposition of guanidine derivatives; with
b. about 0.25 – 2.5 moles of an epoxy compound containing in the molecule on the average more than one epoxy group; and
c. about 0.1 – 2.0 moles of an amine of the general formula

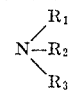

wherein $R_1$ represents an alkyl group having 2–4 carbon atoms or an alkanol group having 2–5 carbon atoms, $R_2$ and $R_3$ represent hydrogen, an alkyl group having 1–4 carbon atoms or an alkanol group having 2–5 carbon atoms, wherein $R_2$ and $R_3$ represent identical or different groups and at least two reactive hydrogen atoms present in the molecule;

and terminating the reaction by the addition of a volatile acid and water. The condensation products are particularly useful as curing agents for dialkyl and alkyl hydrogen polysiloxanes and mixtures thereof, wherein about 10-45 percent of the condensation products, based on the organo polysiloxanes, are employed as the curing agents.

6 Claims, No Drawings

WATER-SOLUBLE OR INHERENTLY WATER-DISPERSIBLE CONDENSATION PRODUCTS

BACKGROUND OF THE INVENTION

The field of the invention is a process for preparing water-soluble or inherently water-dispersible condensation products which cross link with heating. The condensation products are useful as curing agents for organopolysiloxanes.

The state of the prior art may be ascertained by reference to Kirk-Othmer, "Encyclopedia of Chemical Technology", 2nd Ed., Vol. 1 (1963), under the section "Alkanol Amines", pages 809–831; Vol. 2 (1963), under the section "Amines (Lower Aliphatic)", pages 116–127; Vol. 8 (1965), under the section "Epoxy Resins", pages 294–312, particularly pages 295–300, 302, and 306; Vol. 10 (1966), under the section "Guanidine and Guanidine Salts", pages 734–740; and Vol. 18 (1969), under the section "Silicones", pages 221–260, particularly pages 223, 226, 230 and 249. The state of the art of combining resin mixtures containing epoxy resins and polysiloxanes may be ascertained by reference to U.S. Pat. No. 3,449,281 of Sullivan et al. which issued June 10, 1969; U.S. Pat. No. 3,455,877 of Plueddemann which issued July 15, 1969; and U.S. Pat. No. 3,469,139 of Markovitz which issued Feb. 17, 1970.

Kirk-Othmer, Vol. 8 discloses at pages 295–300 the manufacture of the epoxy resins, at page 302 the curing of epoxy resins with aliphatic polyamines and aldehyde condensation products, such as urea, and at page 306 the uses of epoxy coating systems. Kirk- Othmer, Vol. 18 identifies the siloxanes in Table 2 at page 223, gives the properties of the polysiloxanes at page 226, states at page 230 that many substances catalyze the silanol condensation such as the tetramethyl-guanidine salts disclosed in Belgian Pat. No. 685,439 and discloses the use of emulsions of silicone fluids in water for application to textiles at page 249.

The patent to Sullivan et al. discloses the state of the art of water-dispersible epoxy compositions and at column 14 gives a further disclosure that suitable organo silanes may be added in the range of 0.1–2.0 percent by weight of the total aqueous dispersion and these organo silanes are identified as ethoxy silane, gamma methacryloxy propyl trimethoxy silane, 3,4-epoxy cyclohexylethyl trimethoxy silane, and gamma amino propyl triethoxy silane. The patent of Plueddemann discloses the state of the art of modifying epoxide resins by incorporating organosilicone compounds. Markovitz discloses a composition comprising an epoxy resin with 1,2-epoxy groups having as a curing agent the reflux heat reaction products of dimethylphenyltrimethoxytrisiloxane and an amine such as ethanol amine.

According to the prior art, dicyandiamide and melamine are employed in the curing of epoxy resins at elevated temperatures. However, to effect such a curing process wherein only minor catalytic amounts (based on the epoxy resins) of the two compounds are employed, long periods of time, very high temperatures, and also pressure, are necessary for the condensation step. Aqueous solutions cannot be produced from these mixtures, nor from the conversion products, and thereby the possibilities for using these products are greatly limited. The use of the products in the textile industry cannot be contemplated.

Furthermore, condensation products produced by reacting alkanolamines or compounds having only 2 amino-hydrogen atoms together with diglycide ethers of, for example, 4,4'dihydroxydiphenylpropane are conventional. These products exhibit the disadvantage that they do not cure completely even after being heated for a longer period of time at elevated temperatures, and as a result are redissolved in cold water.

Furthermore, another process pertaining to the state of the art is to produce water-soluble condensation products, which are cross-linked under heat, by reacting epoxy compounds with polyamines, wherein preferably 1.5 – 4 reactive hydrogen atoms are present per epoxy group. These products, or organopolysiloxane emulsions containing these products as curing catalysts, exhibit the disadvantage that textile articles treated therewith tend toward yellowing to a greater or lesser extent, depending on the amine content, and as a result of this yellowing the use of the compounds in the textile field is restricted, particularly with respect to white goods.

SUMMARY OF THE INVENTION

Having in mind the limitations of the prior art, it is an object of the present invention to prepare water-soluble or water-dispersible condensation products which cross-link with heating.

Another object of the present invention is an organopolysiloxane emulsion containing the condensation products as curing catalysts.

A particular object is to treat textiles with the water-dispersible condensation products of the present invention.

Still another object of the present invention is to avoid yellowing in the textiles treated with water-dispersible condensation products.

According to the present invention, condensation products which are water-soluble or inherently water-dispersible, and cross-link with heat are prepared by reacting with heat, preferably in the presence of water-miscible solvents boiling above approximately 50°C;

a. about 1 mole of urea or guanidine or the derivatives thereof, or the products obtained by heating the derivatives; with b. about 0.25 – 2.5 moles of a compound containing in the molecule on the average more than one epoxy group; and c. about 0.1 – 2 moles of an amine of the general formula

wherein $R_1$ represents an alkyl group of 2–4 carbon atoms or an alkanol group of 2–5 carbon atoms, $R_2$ and $R_3$ represent hydrogen, an alkyl group of 1–4 carbon atoms, or an alkanol group of 2–5 carbon atoms, wherein $R_2$ or $R_3$ represent identical or different groups, and at least two reactive hydrogen atoms are contained in the molecule; and terminating the reaction by the addition of a volatile acid and water.

DESCRIPTION OF THE PREFERRED EMBODIMENTS

The process of the present invention is normally conducted so that 1 mole of component (a) is heated, together with 0.25 – 2.5 moles, preferably 0.5 – 1.5 moles of the epoxy compound (b), 0.1 – 2 moles and preferably 0.3 – 1.2 moles of the amine (c), in a solvent which is water-miscible and boils at above approximately 50°C, with agitation for about 10-240 minutes to about 60°-140°C. After the viscosity of the mixture has greatly increased, the reaction is stopped by the addition of a volatile acid, such as hydrochloric acid or a lower carboxylic acid, such as formic or acetic acid and water. The instant at which the reaction is stopped is found quickly and simply by solution experiments with small samples of the mixture. For this purpose, a sample of the reaction product is introduced into approximately 2 percent acetic acid. The reaction is terminated as soon as a clear to opalescent solution is formed thereby. By the addition of the volatile acid and the water, an approximately 5-20 percent, colorless to yellowish solution of the condensation product is produced, having a pH of about 4-6.

The solvent serves as the diluent during the reaction and is customarily employed in amounts of 20-35 percent, based on the mixture of components (a), (b), and (c). Preferably, aliphatic monohydric alcohols of 2-5 carbon atoms are employed as the solvent. However, other solvents boiling at above approximately 50°C are likewise suitable, such as ketones, polyhydryc alcohols, esters, and ethers, as long as they are sufficiently soluble in water. Examples in this connection are methyl ethyl ketone, glycol, glycol monoacetate, and glycol monoethyl ether.

Specific examples of the volatile acids are hydrochloric acid, formic acid, acetic acid, hydrobromic acid and propionic acid.

The specific examples of the solvent which is water-miscible and boils at above approximately 50°C include ethyl alcohol, propyl alcohol, butyl alcohol, pentyl alcohol, methyl ethyl ketone, glycol, glycol monoacetate, glycol monoethyl ether, methylacetat, butylenglycol, glycoldiacetat, glycol dimethyl ether, propandiol-(1,2), glycerin and diethylene glycol.

In the process of this invention, the starting material (a) employed is urea, guanidine, the derivatives thereof, or the products thereof obtained by heating urea or guanidine. Examples of such compounds are, in addition to urea and guanidine: acetoguanidine, cyanamide (obtained by heating urea in the presence of thionyl chloride), dicyandiamide, melamine, alkyl and aryl guanamines (obtained, inter alia, while heating the corresponding guanidine salts), such as benzo-, aceto-, butyro-, coconut-, and stearoguanamine, ethylene urea, propylene urea, and biuret. In this group of compounds, dicyandiamide, cyanamide, and aryl or alkyl guanamines are preferably employed.

The derivatives of urea according to the invention include thiourea, ethylene urea, propylene urea, dihydroxy ethylene urea, oxypropylene urea, N-methylurea and N,N'-diethyl urea.

Guanidine derivatives according to the invention include acetoguanidine and aminoguanidine.

Products obtained by heating urea according to the invention include buiret, cyanamid, dicyandiamid and melamine.

Products obtained by heating guanidine according to the invention include alkyl and aryl guanamines, such as benzo-, aceto-, butyro-, coconut-, and stearoguanamine.

Suitable compounds (b), containing, on the average, more than 1 epoxy group in the molecule, are the glycidyl ethers of polyhydric aliphatic alcohols, such as ethylene glycol, diethylene glycol, propylene glycol, butylene glycol, glycerin, 1,2,3-trihydroxybutane, triethylene glycol, and, in general polyalkylene glycols having a molecular weight of up to about 300 or of polyphenols, such as pyrocatechol, resorcinol, hydroquinone, 1,4-dihydroxynaphthalene, 4,4'-dihydroxydiphenylmethane, or 4,4'-dihydroxydiphenylpropane. Furthermore, the glycidyl esters of aliphatic or aromatic dicarboxylic acids can be employed, for example, adipic acid, sebacic acid, and terephthalic acid. Mixtures of glycidyl ethers and glycidyl esters are likewise usable. Additionally, the epoxy compounds of organopolysiloxanes can be very advantageously utilized, among which the glycidyl ethers of polysiloxanes wherein more than one glycidyl ether group is bound by way of short chain alkylene groups deserve special mention. The glycidyl ether groups are preferably at the end of the molecule.

Specific examples of the compounds having more than 1 epoxy group in the molecule according to the invention include 4,4'-dihydroxydiphenylpropane diglycidyl ether, diglycidyl ether of polyethylene glycol having a MW of 200, glycerine diglycidyl ether having a MW of about 204, glycidyl ether of ethylene glycol having an epoxy number of 0.57, glycidyl ether of resorcinol having an epoxy number of 0.8, an organopolysiloxane diglycidyl ether of the formula

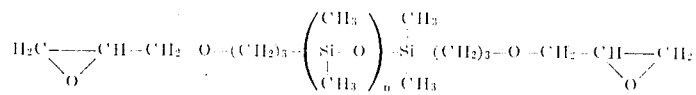

wherein n, on the average, is about 10 and the epoxy number is 0.193, glycidyl ether of 4,4'-dihydroxydiphenylmethane having an epoxy number 0.43, adipic acid glycidyl ester having an epoxy number of 0.5, 1,2,3-trihydroxybutane diglycidyl ether, glycidyl ether of butandiol-(1,4) having an epoxy number of 0.85, glycidyl ether of diethylene glycol having an epoxy number of 0.77, glycidyl ether of pyrocatechol having an epoxy number of 0.67, glycidyl ether of 1,4-dihydroxynaphthalene having an epoxy number of 0.68, terephthalic acid glycidyl ester having an epoxy number of 0.6.

The amines (c) employed for the process of this invention have the general formula

wherein
R$_1$ represents an alkyl group of 2–4 carbon atoms, or an alkanol group of 2–5 carbon atoms,
and R$_2$ as well as R$_3$ represent hydrogen, an alkyl group of 1-4 carbon atoms, or an alkanol group of 2–5 carbon atoms,
wherein R$_2$ and R$_3$, respectively, represent identical or different groups, and at least 2 reactive hydrogen atoms are present in the molecule.

Examples of the amines according to the invention are: triethanolamine, triisopropanolamine, N-butyl- and N-methyldiethanolamine, diethanolisopropanolamine, N-ethylisopropanolamine, N-methylethanolamine, N-propylisopropanolamine, monoethanolamine, monoisopropanolamine, butylamine, and 3-amino-1-propanol. Especially suitable in the present process are the trialkanol- or alkyldi-alkanol amines.

The heat curable condensation products which are water-soluble or are self-dispersing in water, produced in accordance with the present invention, are eminently suitable as curing catalysts for organopolysiloxanes conventionally emulsified with nonionic or cationic emulsifiers. In this connection, short curing periods and relatively low curing temperatures are sufficient to obtain a superior water repellency on textile materials of natural fibers, such as cotton and wool, as well as mixtures thereof with synthetic fibers. The condensation products produced according to the invention are also eminently suitable as varnish additives. The resistance of these coatings to water, acids, and organic solvents is further improved by the addition of compounds forming aminoplast resins, for example, methylol melamines, methylol ureas, and methylol compounds of urea derivatives.

Suitable organopolysiloxanes are dialkyl and alkyl hydrogen polysiloxanes, and mixtures thereof. Preferred are methyl hydrogen polysiloxanes and the mixtures thereof with dimethyl polysiloxanes.

Specific examples of the organopolysiloxanes according to the invention include methyl hydrogen polysiloxanes, ethyl hydrogen polysiloxanes, dimethyl polysiloxanes, diethylpolysiloxanes and mixtures of these polysiloxanes.

The amount of condensation products is generally 5 to 80 percent and preferably 10–45 percent of the pure condensation product, based on the weight of the organopolysiloxanes. The drying and condensation steps are conducted in a conventional manner.

Especially advantageous condensation products are obtained by reacting the starting components (a) and (b) with trialkanolamines. For these products exhibit an excellent solubility and, in this connection, yield completely colorless solutions.

During the heating of these solutions, hard and smooth films are obtained which are insoluble in cold as well as hot water. On the basis of these excellent properties, these condensation products are especially suitable as curing catalysts for organopolysiloxanes.

The advantages of the condensation products manufactured in accordance with the process of this invention reside in the application thereof. Thus, it is emphasized, in particular, that the fibrous materials treated with these products, or with organopolysiloxane emulsions containing these products as curing catalysts, do not exhibit yellowing and rather, the degree of whiteness of the treated fibrous materials remains unaltered. Since these condensation products are self-curing, a sizing which is resistant against water and solvent is obtained by simply heating, so that it is unnecessary to wash the treated textiles subsequently. This is particularly true when these products are employed as curing catalysts for organopolysiloxanes.

Preferred examples of the overall combination (a), (b) and (c) in parts by weight include:

35 4,4'-dihydroxydiphenylpropane diglycidyl ether, 4 cyanamide and 15 triethanolamine; 60 diglycidyl ether of polyethylene glycol 200, 4 cyanamide and 16.4 diethanol-isopropanolamine; 11 glycerine diglycidyl ether, 6 urea and 1.83 monoethanolamine, 300 glycidyl ether of glycol having an epoxy number of 0.57, 190 benzoguanidine and 59.5 N-methyl-diethanolamine; 66 glycidyl ether of resorcinol having an epoxy number of 0.8, 85 dicyandiamide, and 146 butylamine; 80 organopolysiloxane diglycidyl ether of the formula

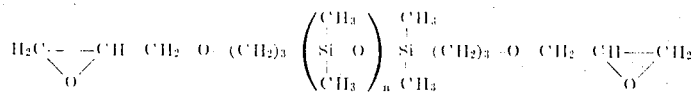

wherein $n$, on the average, is about 10 having an epoxy number of 0.193, 8.5 dicyandiamide and 10 ethanolisopropanolamine; 43 glycidyl ether of 4,4'-dihydroxydiphenylmethane having an epoxy number of 0.43, 8.6 ethylene urea and 25 triisopropanolamine; 220 adipic acid glycidyl ester having an epoxy number of 0.5, 42 cyanamide and 149 triethanolamine; 130 glycidyl ether of butandiol-(1,4) having an epoxy number of 0.85, 58 N, N'-diethyl urea and 51 N-ethyl isopropanolamin; 110 adipic acid glycidyl ester having an epoxy number of 0.5, 110 glycidyl ether of 4,4'-dihydroxydiphenylpropane having an epoxy number of 0.43, 42 cyanamid and 149 triethanolamin; 250 terephthalic acid glycidyl ester having an epoxy number of 0.6, 103 buiret and 75 triethanolamin.

Without further elaboration, it is believed that one skilled in the art can, using the preceding description, utilize the present invention to its fullest extent.

EXAMPLE 1.

Thirty-five g. of 4,4'-dihydroxydiphenylpropane diglycidyl ether, 4 g. of cyanamide, 15 g. of triethanolamine, and 12 g. of isobutanol are heated under reflux for 35 minutes under agitation. Thereafter the reaction is terminated by the addition of a mixture of 18 g. of 60 percent acetic acid and 450 g. of water, and a clear to opalescent solution with a pH of 4,7 is obtained. This solution can be diluted with water in any proportion.

A sample of the solution obtained as above is evaporated to dryness at 80°C and heated for 5 minutes to 150°C. A blister-free film is obtained which is insoluble in cold and hot water.

An equally satisfactory product is obtained by reacting 2.5 or 5 g. of triethanolamine.

When a product is obtained in the same manner, but only from 4,4'-dihydroxydiphenylpropane diglycidyl ether and triethanolamine without the cyanamide, and the product is dried and heated in the same fashion, a soft film is produced which is readily dissolved in cold water.

The reaction of 4,4'-dihydroxydiphenylpropane diglycidyl ether and cyanamide yields, using the same mode of operation, products which are insoluble in water and dilute acids.

EXAMPLE 2.

In a three-necked flask having a capacity of 500 ml., there are heated, with agitation, 60 g. of a diglycidyl ether of polyethylene glycol having a MW of 200, 4 g. of cyanamide, 16.4 g. of diethanolisopropanolamine, and 12 g. of n-butanol to a temperature of 120°C. After obtaining a clear, strongly viscous mixture, the latter is diluted by the addition of acetic acid and water to a 12 percent solution having a pH of 4.5, and this solution is employed as a curing catalyst for organopolysiloxanes.

EXAMPLE 3.

Eleven g. of glycerine diglycidyl ether, 6 g. of urea, 1.83 g. of monoethanolamine, and 6 g. of butanol are heated under reflux to 125°C with agitation, and the reaction is terminated after about 15 minutes by the addition of an amount of hydrochloric acid and water so that a 15 percent, almost clear, colorless solution is obtained having a pH of 5.0. A film made from this product is resistant to cold as well as hot water.

The same reaction is conducted in a shorter period of time with cooling, when the step is carried out in the absence of the solvent.

EXAMPLE 4:

Three hundred g. of a glycidyl ether of ethylene glycol having an epoxy number of 0.57, 190 g. of benzoguanamine and 59.5 g. of N-methyl-diethanolamine are boiled under reflux in the presence of 160 g. of propanol and, after a pronounced increase of the viscosity, the reaction is terminated by the addition of formic acid and water. As a result, a 10 percent opalescent solution is obtained having a pH of 4.8. In the same manner, equivalent amounts of aceto-, butyro-, caprino- and stearoguanamine are reacted, also resulting in opalescent solutions which, after heating, yield films resistant to water and solvents.

EXAMPLE 5.

Sixty-six g. of a glycidyl ether of resorcinol having an epoxy number of 0.8, 85 g. of dicyandiamide, 146 g. of butylamine and 100 g. of glycol monoethyl ether are agitated under reflux until the reaction mixture has become practically clear, and a marked increase in viscosity is observed after about 1 ½ hours. Then, the reaction is terminated by the addition of propionic acid and water, and the mixture is adjusted to a concentration of 8 percent. An opalescent, shelf-stable solution is obtained having a pH of 5.5, which after drying and brief heating yields a waterproof film.

The reaction is also conducted in the absence of the solvent and a considerably shorter reaction time is necessary.

EXAMPLE 6.

Eighty g. of an organopolysiloxane diglycidyl ether of the formula

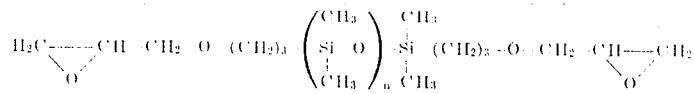

wherein $n$, on the average, is about 10 having an epoxy number of 0.193, 8.5 g. of dicyandiamide, and 10 g. of ethanolisopropanolamine are boiled under reflux for about 90 minutes in the presence of 18 g. of isopropanol. After a marked increase in viscosity, the reaction mixture is adjusted to a pH of 4.3 by the addition of acetic acid and water to form a 15 percent solution. A shelf-stable solution is produced which when mixed with water in any proportion yields, after evaporation of the solvent and brief heating to 150°C, a water- and solvent-proof film.

EXAMPLE 7.

Forty-three g. of the glycidyl ether of 4,4'-dihydroxydiphenyl-methane having an epoxy number of 0.43, 8.6 g. of ethylene urea, and 25 g. of triisopropanolamine are boiled under reflux in the presence of 22 g. of isobutanol with stirring for about 25 minutes. After a marked increase in viscosity, the reaction is terminated by the addition of acetic acid and water, whereby an 11 percent solution of pH 4.6, is obtained. This solution is employed as a curing agent for organopolysiloxanes.

EXAMPLE 8.

Two hundred and twenty g. of adipic acid glycidyl ester having an epoxy number of 0.5, 42 g. of cyanamide, and 149 g. of triethanolamine are boiled under reflux in the presence of 100 g. of isobutanol and, after an increase in the viscosity, the reaction is terminated by the addition of acetic acid and water, thus obtaining a 12 percent, slightly opalescent solution having a pH of 4.8. After heating, this solution yields waterproof films and is eminently suitable as a curing catalyst for organopolysiloxanes.

The same properties are exhibited by a condensation product which is obtained by exchanging, under otherwise identical conditions, half of the adipic acid glycidyl ester for the glycidyl ether of 4,4'-dihydroxydiphenylpropane having an epoxy number of 0.43.

EXAMPLE 9.

A cotton fabric (weight per square meter about 170 g.) is saturated with a liquor containing, per liter, 50 g. of a 30 percent methyl hydrogen polysiloxane emulsion emulsified in the conventional manner with polyvinyl alcohol, and 40 g. of the solution of the condensation product prepared in accordance with Example 1. Thereafter the fabric is squeezed to an absorption of the liquor of 75 percent, dried at 120°C, and condensed for 5 minutes at 150°C. the treated fabric thus obtained exhibits a water absorption of only 8 percent and an excellent waterrepellent effect according to the method of Bundesmann as disclosed in DIN 53888.

EXAMPLE 10.

A cotton-polyester blend fabric 35/65 is saturated with a liquor containing, per liter, 50 g. of a 25 percent organopolysiloxane emulsion emulsified with stearic acid polyglycol ether (50 parts of methyl hydrogen polysiloxane and 50 parts of dimethylpolysiloxane) and 30 g. of the solution of the condensation product prepared in accordance with Example 4, and finished as described in Example 9. The fabric exhibits an excellent water-repellent effect and absorbs only 10 percent of water in a 10 minute rain test according to the method of Bundesmann.

We claim:

1. A process for preparing water-soluble respectively inherently water-dispersible condensation products comprising reacting with heating a mixture consisting of
    a. about 1 mole of a compound selected from the group consisting of urea, guanidine, acetoguanadine, cyanamide, dicyandiamide, melamine, alkyl guanamines, aryl guanamines, ethylene urea, propylene urea and biuret;
    b. about 0.25 – 2.5 moles of an epoxy resin compound containing in the molecule on the average more than one epoxy group; and
    c. about 0.1 – 2 moles of an amine of the general formula

wherein $R_1$ is an alkyl group having 2–4 carbon atoms or an alkanol having 2–5 carbon atoms, $R_2$ and $R_3$ are independently selected from hydrogen, an alkyl group having 1–4 carbon atoms or an alkanol having 2–5 carbon atoms, and said amine of the general formula has at least 2 reactive hydrogen atoms present in the molecule and terminating the reaction by the addition of a volatile acid and water.

2. The process of claim 1 wherein the reaction is carried out in the presence of a water-miscible solvent having a boiling point at above approximately 50°C.

3. The process of claim 1, wherein about 1 mole of component (a) is reacted with about 0.5 – 1.5 moles of component (b) and about 0.3 – 1.2 moles of component (c).

4. The process of claim 1, wherein component (a) is aryl guanamines.

5. The process of claim 1, wherein component (a) is alkyl guanamines.

6. A process for preparing water-soluble respectively inherently water-dispersible condensation products comprising reacting with heating a mixture consisting of
    a. about 1 mole of a compound selected from the group consisting of urea, cyanamide and dicyandiamide;
    b. about 0.25 – 2.5 moles of an epoxy resin compound containing in the molecule on the average more than one epoxy group and selected from the group consisting of glycidyl ether of 4,4'-dihydroxy-diphenylpropane, glycerine and ethylene glycol, glycidyl ethers of dicarboxylic acids and mixtures thereof; and
    c. about 0.1 – 2 moles of an amine of the general formula

wherein $R_1$ is an alkyl group having 2–4 carbon atoms or an alkanol having 2–5 carbon atoms, $R_2$ and $R_3$ are independently selected from hydrogen, an alkyl group having 1–4 carbon atoms or an alkanol having 2–5 carbon atoms, and said amine of the general formula has at least two reactive hydrogen atoms present in the molecule and is a trialkanolamine or a N-alkyldialkanolamine and terminating the reaction by the addition of a volatile acid and water.

* * * * *